US006089098A

United States Patent [19]

Tylisz et al.

[11] Patent Number: 6,089,098

[45] Date of Patent: Jul. 18, 2000

[54] DIFFERENTIAL PRESSURE SWITCH HAVING AN ISOLATED HALL EFFECT SENSOR

[75] Inventors: Brian M. Tylisz, LaPorte; Ronald R. Krueger, Michigan City, both of Ind.

[73] Assignee: Dwyer Instruments, Inc., Michigan City, Ind.

[21] Appl. No.: 09/264,194

[22] Filed: Mar. 8, 1999

Related U.S. Application Data

[60] Provisional application No. 60/082,015, Apr. 16, 1998.

[51] Int. Cl.[7] ................................ G01L 9/10; G01L 9/14

[52] U.S. Cl. ................................ 73/722

[58] Field of Search .................. 73/722, 728; 200/81 R, 200/81.5, 82 C, 82 R, 83, 83 B, 83 L, 83 J, 83 S, 83 V, 61.21

[56] References Cited

U.S. PATENT DOCUMENTS

| | | | |
|---|---|---|---|
| 3,566,060 | 2/1971 | Phillips et al. | 200/83 |
| 3,839,609 | 10/1974 | Pijpers | 200/83 B |
| 3,946,176 | 3/1976 | Goff et al. | 200/83 J |
| 3,989,911 | 11/1976 | Perry | 200/83 L |
| 4,084,072 | 4/1978 | Tsubota et al. | 200/83 L |
| 4,266,517 | 5/1981 | Sakakibara et al. | 200/81.5 |
| 4,631,374 | 12/1986 | Zoludow | 200/61.21 |
| 4,827,095 | 5/1989 | Clark et al. | 200/82 C |
| 5,061,832 | 10/1991 | Squires | 200/83 J |

*Primary Examiner*—William Oen
*Attorney, Agent, or Firm*—Lee, Mann, Smith, McWilliams, Sweeney & Ohlson

[57] ABSTRACT

A differential pressure switch comprising an enclosure including a peripheral wall and a solid one-piece non-perforate partition wall that is integrally attached to the peripheral wall around the entire perimeter of the partition wall. The enclosure includes a sensor chamber located on a first side of the partition wall and a fluid cavity located on a second side of the partition wall. The partition wall and the integrally attached peripheral wall seal the sensor chamber in fluid-tight leak-proof isolation from the fluid cavity. A flexible diaphragm is located within the fluid cavity and forms a low-pressure fluid chamber on one side and a high-pressure fluid chamber on a second side of the diaphragm. A magnet is located in the fluid cavity and is coupled to the diaphragm such that the magnet changes position in response to movement of the diaphragm. A Hall effect sensor is located in the sensor chamber. The sensor is adapted to sense the magnetic force generated by the magnet and thereby detect the distance between the magnet and the sensor. The sensor indicates when the magnet is located a predetermined distance from the sensor such that a predetermined differential in pressure exists between the pressure of the fluid in the low-pressure fluid chamber and the pressure of the fluid in the high-pressure fluid chamber.

15 Claims, 3 Drawing Sheets

DIFFERENTIAL PRESSURE SWITCH HAVING AN ISOLATED HALL EFFECT SENSOR

RELATED APPLICATIONS

This application claims the benefit of U.S. Provisional Application No. 60/082,015, filed Apr. 16, 1998.

BACKGROUND OF THE INVENTION

The present invention is directed to a differential pressure switch having a Hall effect sensor located in a sensor chamber for detecting the position of a magnet coupled to a flexible diaphragm that separates a low-pressure fluid chamber from a high-pressure fluid chamber, and in particular to a differential pressure switch wherein the Hall effect sensor and the sensor chamber are isolated and sealed fluid-tight from the low and high-pressure fluid chambers by an integrally-formed non-perforate wall.

Differential pressure switches such as disclosed in U.S. Pat. No. 3,566,060 include a diaphragm located between a low-pressure fluid chamber and a high-pressure fluid chamber. A mechanical switch is located in a switch chamber that is separated from the low-pressure fluid chamber by a separating wall. However, the separating wall includes an aperture through which the switch is mechanically coupled to the diaphragm, such that the fluid within the low-pressure fluid chamber is in contact with the mechanical switch. Any mechanical or adhesive seal between the switch and the separating wall can also leak and allow fluid to enter the switch chamber. The mechanical switch includes electrical contacts that can ignite the flammable fluid from the low-pressure chamber and cause an explosion.

The present invention enables the position of the diaphragm to be monitored by a sensor and other electrically operated components located in a sensor chamber that is sealed in fluid-tight isolation from the low and high-pressure fluid chambers by a one-piece non-perforate partition wall such that fluid within the low and high-pressure fluid chambers cannot come into contact with the electrical components of the switch and cause an explosion.

SUMMARY OF THE INVENTION

A differential pressure switch comprising an enclosure including a peripheral wall and a solid one-piece non-perforate integrally formed partition wall that is integrally attached to the peripheral wall around the entire perimeter of the partition wall. The enclosure includes a sensor chamber located on a first side of the partition wall and a fluid cavity located on a second side of the partition wall. The partition wall and the integrally attached peripheral wall seal the sensor chamber in fluid-tight leak-proof isolation from the fluid cavity without the use of any mechanical or adhesive seal. A generally planar flexible diaphragm is located within the fluid cavity. The diaphragm forms a low-pressure fluid chamber on a first side of the diaphragm and a high-pressure fluid chamber on a second side of the diaphragm. The diaphragm creates a fluid-tight seal between the low-pressure fluid chamber and the high-pressure fluid chamber. A central portion of the diaphragm is moveable in response to changes in the differential pressure between the pressure of a fluid in the low-pressure fluid chamber and the pressure of a fluid in the high-pressure fluid chamber.

A magnet is located in the fluid cavity and is coupled to the diaphragm by a lever that is pivotal about a pivot axis. The magnet is located in a spaced relationship to the partition wall such that the magnet changes position, by pivotal movement about the pivot axis, with respect to the partition wall in response to movement of the diaphragm. A Hall effect sensor is located in the sensor chamber and is connected to the free end of a flexible arm. The sensor and the magnet are thereby located on opposite sides of the partition wall. The sensor is adapted to sense the magnetic force generated by the magnet and thereby detect the distance between the magnet and the sensor. The sensor is adapted to indicate when the magnet is located a predetermined distance from the sensor such that a predetermined differential in pressure exists between the pressure of the fluid in the low-pressure fluid chamber and the pressure of the fluid in the high-pressure fluid chamber. The partition wall and the integrally attached peripheral wall maintain the sensor and other electrical components of the switch sealed in fluid-tight isolation from the low-pressure fluid chamber and the high-pressure fluid chamber, such that fluid from the low-pressure and the high-pressure fluid chambers cannot enter the sensor chamber and come into contact with the electrical components contained therein, thereby preventing an explosion that could otherwise arise by the electrical components igniting the fluid.

BRIEF DESCRIPTION OF THE DRAWING FIGURES

DETAILED DESCRIPTION OF THE PREFERRED EMBODIMENT

Figure 2:
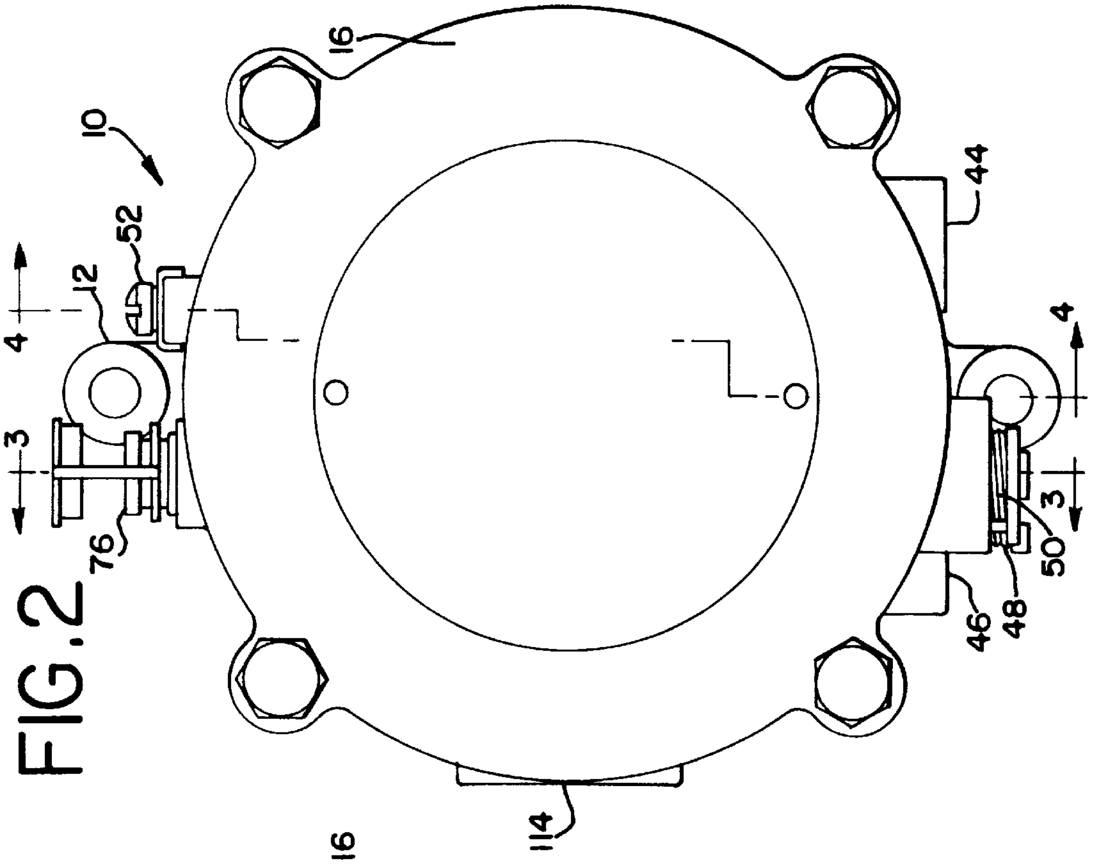
FIG. 2 is a front elevational view of the differential pressure switch.
Figure 1:
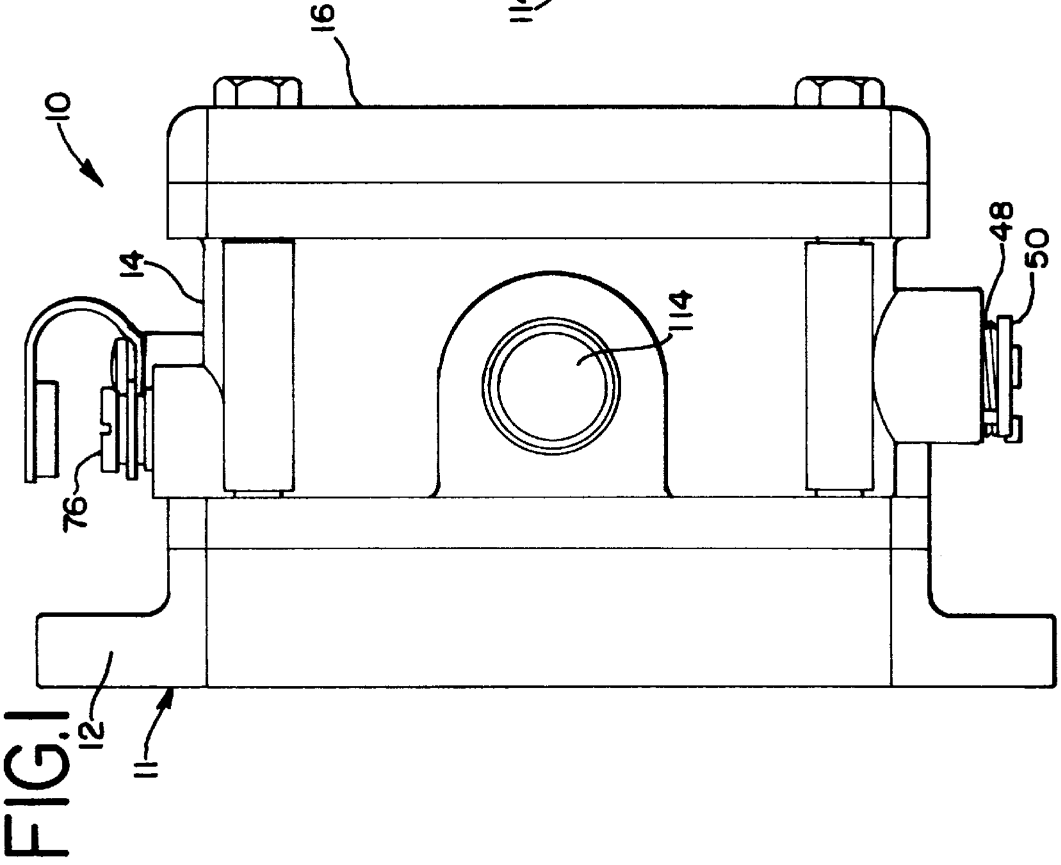
FIG. 1 is a side elevational view of the differential pressure switch of the present invention.
Figure 4:
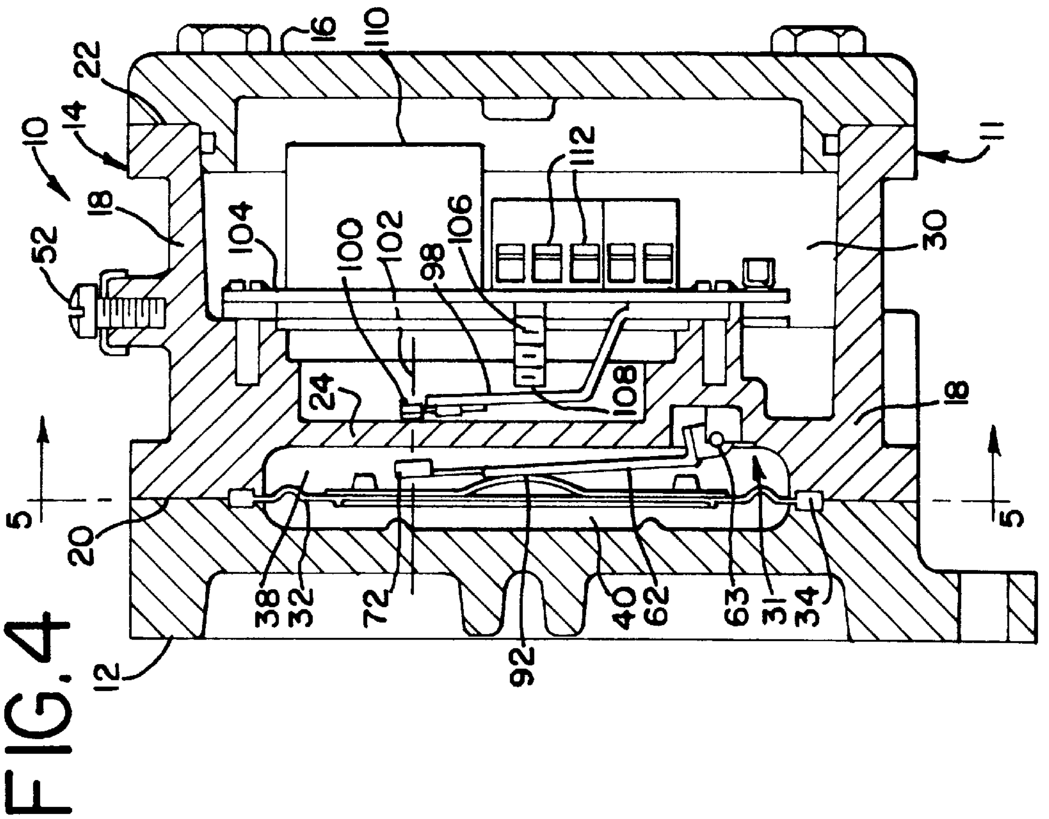
FIG. 4 is a cross-sectional view taken along line 4—4 of FIG. 2.
Figure 3:
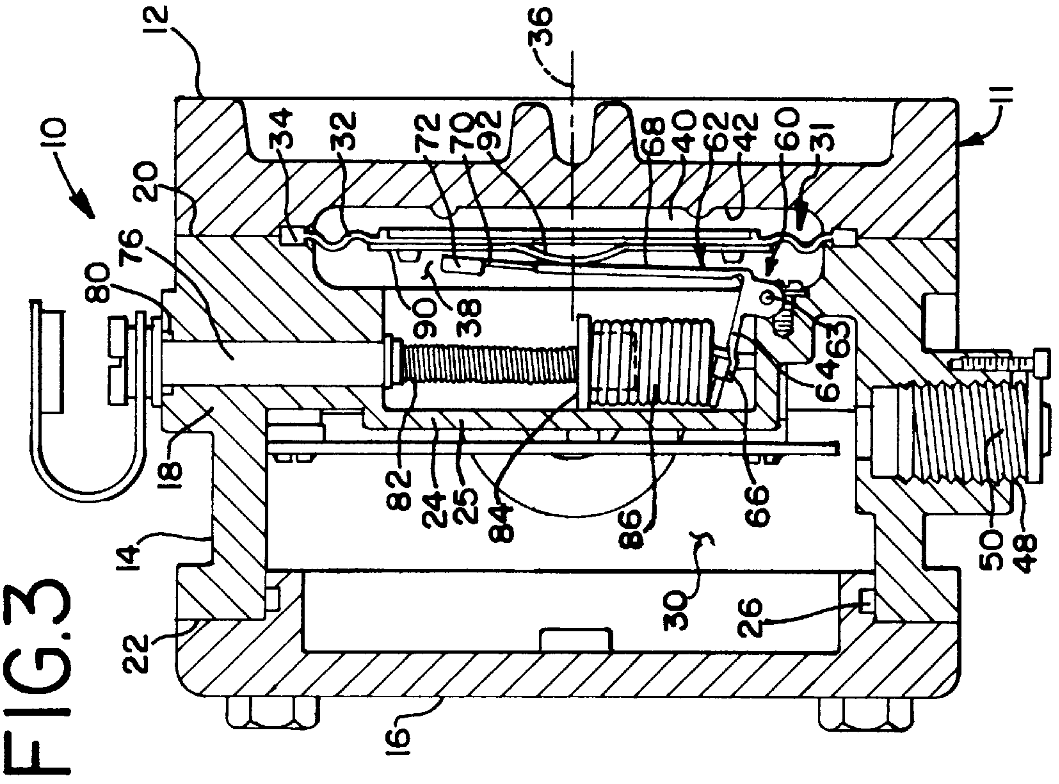
FIG. 3 is a cross-sectional view taken along line 3—3 of FIG. 2.
Figure 5:
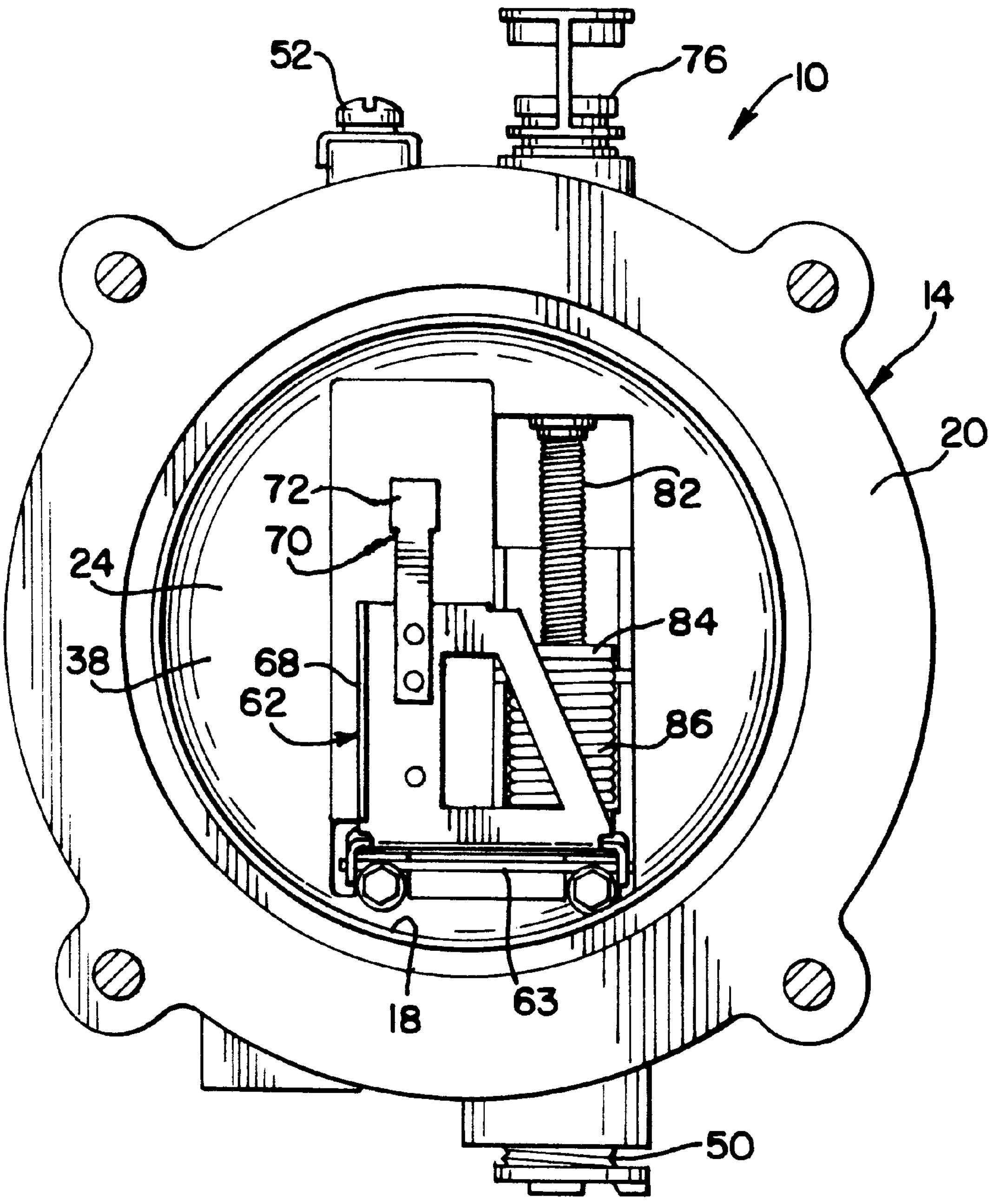
FIG. 5 is a cross-sectional view taken along line 5—5 of FIG. 4.

The differential pressure switch 10 includes an enclosure 11 having a base 12 adapted to be selectively mounted to a stationary structure, a housing 14, and a cover 16. The housing 14 includes a generally cylindrical outer peripheral wall 18 that extends longitudinally between a first end 20 and a second end 22. The housing 14 includes a solid one-piece integrally-formed non-perforate partition wall 24 located within and integrally attached to the peripheral wall 18 around the entire perimeter of the partition wall 24. The partition wall 24 includes a generally planar portion 25. The base 12 is selectively attached to the first end 20 of the housing 14 by threaded fasteners and the cover 16 is selectively attached to the second end 22 of the housing 14 by threaded fasteners. The cover 16 is sealed fluid-tight to the first end 20 of the housing 14 by an elastomeric O-ring 26. The differential pressure switch 10 includes a sensor chamber 30 formed by the peripheral wall 18, the partition wall 24 and the cover 16. The differential pressure switch 10 also includes a fluid cavity 31 formed by the peripheral wall 18, the partition wall 24 and the base 12. The enclosure 11 is an explosion proof enclosure designed to contain an internal explosion if a fluid is ignited in the sensor chamber 30.

The differential pressure switch 10 also includes a generally planar disc-shaped elastomeric flexible diaphragm 32 having a generally circular peripheral rib 34 and a perpendicular central axis 36. The peripheral rib 34 of the diaphragm 32 is located between the base 12 and the first end 20 of the housing 14 and creates a fluid-tight seal therebetween. The differential pressure switch 10 includes a low-pressure fluid chamber 38 formed by the peripheral wall 18 and partition wall 24 of the housing 14, and by the diaphragm 32. The differential pressure switch 10 also includes a high-pressure fluid chamber 40 formed by the diaphragm 32 and a cavity 42 formed in the base 12. The low-pressure fluid chamber 38 is thereby separated and sealed fluid-tight from the high-pressure fluid chamber 40 by the flexible diaphragm 32.

The sensor chamber 30 is sealed fluid-tight and in leak-proof isolation from the low-pressure fluid chamber 38 by the solid one-piece non-perforate partition wall 24 and the integral attachment of the wall 24 to the peripheral wall 18, without the use of a seal formed between two adjoining parts. The non-perforate partition wall 24 thereby isolates and seals the sensor chamber 30 fluid-tight from fluid in the low-pressure fluid chamber 38 entering the sensor chamber 30, and from fluid in the high-pressure fluid chamber 40 entering the sensor chamber 30 if the diaphragm 32 should leak.

The housing 14 includes a low-pressure inlet port 44 that is in fluid communication with the low-pressure fluid chamber 38. The housing 14 also includes a high-pressure inlet port 46 that is in fluid communication with the high-pressure fluid chamber 40. The housing 14 also includes a condensation drain port 48 that is in fluid communication with the sensor chamber 30. The condensation drain port 48 allows any condensation that may form within the sensor chamber 30 to be drained from the sensor chamber 30. A threaded plug 50 is threadably attached to the drain port 48 with a loose fit to allow condensation to be drained, but while retaining the explosion-proof integrity of the sensor chamber 30. The housing 14 also includes a ground screw 52 attached thereto. The base 12, the housing 14, wall 24, and the cover 16 are preferably made from metal such as aluminum.

The differential pressure switch 10 includes a diaphragm position indicating mechanism 60. The position indicating mechanism 60 is located within the low-pressure fluid chamber 38 and does not extend into the sensor chamber 30. The position indicating mechanism 60 includes a generally L-shaped lever 62 pivotally attached to the housing 14. The lever 62 is pivotal about a pivot axis 63. The lever 62 includes a first leg 64 having an outer end 66 and a second leg 68 having an outer end 70. The legs 64 and 68 are generally perpendicular to one another. The first leg 64 is relatively short compared to the length of the second leg 68. A magnet 72 is attached adjacent to the outer end 70 of the second leg 68 such that the magnet 72 is pivotally moveable about the pivot axis 63.

A rotatable adjusting screw 76 extends through the peripheral wall 18 of the housing 14 into the low-pressure fluid chamber 38. The screw 76 is rotatably sealed to the peripheral wall 18 by an elastomeric O-ring 80. The screw 76 includes a threaded shank portion 82 that is threadably engaged to a generally rectangular plate 84 having a cylindrical projection with helical grooves. The rectangular plate 84 is located adjacent to the partition wall 24 such that the wall 24 will prevent the plate 84 from rotating. A helical coil spring 86 is attached at one end to the projection of the rectangular plate 84 and thereby to the screw 76 and is attached at an opposite end to the outer end 66 of the first leg 64 of the lever 62. Selective rotation of the adjusting screw 76 adjusts the magnitude of the tensile force created in the coil spring 86 and that is applied to the outer end 66 of the first leg 64. The tensile force created by the coil spring 86 pivots the lever 62 and the magnet 72 about the pivot axis 63. The respective longitudinal axes of the screw 76 and the spring 86 are generally coaxial with one another and generally perpendicular to the transverse axis 36 of the diaphragm 32.

A generally circular rigid metal disc 90 is located within the low-pressure fluid chamber 38 generally parallel to and in overlying engagement with the diaphragm 32. The disc 90 includes a centrally located generally spherical projection 92 that projects inwardly into the low-pressure fluid chamber 38 and toward the partition wall 24. The coil spring 86 pivots and presses the second leg 68 of the lever 62 into biased engagement with the projection 92 of the disc 90 and thereby with the diaphragm 32. The magnet 72 is thereby coupled to the diaphragm 32 such that the magnet 72 changes position in response to a change in position of the diaphragm 32. The amount of force with which the lever 62 presses against the disc 90 and diaphragm 32 can be selectively adjusted by appropriate rotation of the adjusting screw 76.

The differential pressure switch 10 includes a flexible arm 98 having a free end and a fixed end attached to the housing 14. A Hall effect sensor 100 is attached to the free end of the arm 98. A preferred Hall effect sensor 100 is the Model No. SS441A unipolar digital position sensor as manufactured by Honeywell, Inc. of Freeport, Ill. The arm 98 and Hall effect sensor 100 are located within the sensor chamber 30 and are completely isolated and sealed from the fluid chambers 38 and 40 by the integral partition wall 24 and the integrally attached peripheral wall 18. The Hall sensor 100 and the magnet 72 are positioned on opposite sides of the partition wall 24. The Hall sensor 100 and the magnet 72 are generally located across from one another on opposite sides of the partition wall 24 and are generally aligned with one another along an axis 102 that is approximately parallel to the transverse axis 36 of the diaphragm 32. A printed circuit board 104 is attached to the housing 14 within the sensor chamber 30. A plastic threaded screw 106 having a threaded shank is rotatably attached to the circuit board 104 and includes a tip 108 that engages the flexible arm 98. Selective rotation of the screw 106 pivots the arm 98 and adjusts the distance at which the sensor 100 is located from the partition wall 24 and thereby the distance of the sensor 100 from the magnet 72 when the magnet 72 is located in any one given position.

The Hall effect sensor 100 is electrically connected to an electrical relay circuit 110 having a plurality of contacts 112. The relay circuit 110 is a non-isolated, capacitive reactive, zener regulated circuit that accepts a high-voltage alternating current input and that provides a low-voltage direct current power supply to drive the Hall effect sensor 100 and the relay circuit 110. A preferred relay 110 is Model No. T9AS5D12-110 as manufactured by Potter & Brumfield Division of Siemens Electromechanical Components, Inc. of Princeton, Ind. Appropriate electrical wiring is attached to the contacts 112 and extends through a port 114 in the housing 14 for connection to any desired device for control by the switch 10.

In operation, the low-pressure inlet port 44 is connected to a fluid conduit that supplies fluid, preferably a gas, to the low-pressure fluid chamber 38, and the high-pressure inlet port 46 is connected to a fluid conduit that supplies fluid, preferably a gas, to the high-pressure fluid chamber 40. The fluid in the high-pressure fluid chamber 40 has a pressure that is relatively higher than the pressure of the fluid in the low-pressure fluid chamber 38 such that there is a pressure differential between the fluids in the respective chambers 38 and 40. The pressure of the fluids in the fluid chambers 38 and 40 may be greater than or less than atmospheric pressure.

The magnet 72 and the lever 62 pivot about the axis 63 as a function of the pressure differential acting on the diaphragm 32. As the pressure differential between the fluid in the high-pressure fluid chamber 40 and the pressure of the fluid in the low-pressure fluid chamber 38 increases, the fluid in the high-pressure fluid chamber 40 presses and moves the center portion of the diaphragm 32 outwardly toward the low-pressure fluid chamber 38 and toward the second leg 68 of the lever 62 and the partition wall 24 generally along the axis 36. As the diaphragm 32 moves outwardly toward the low-pressure fluid chamber 38, the diaphragm 32 presses the disc 90 and its projection 92 into engagement with the second leg 68 of the lever 62 and pivots the lever 62 about the axis 63 thereby pivotally moving the magnet 72 into closer proximity to the Hall effect sensor 100. As the pressure differential between the fluids in the low-pressure fluid chamber 38 and the high-pressure fluid chamber 40 decreases, the diaphragm 32 and the disc 90 will move along the axis 36 in an opposite direction away from the second leg 68 of the lever 62 and away from the partition wall 24 and sensor 100. As the diaphragm 32 and disc 90 move away from the second leg 68 and partition wall 24, the spring 86 pivots the lever 62 to maintain contact between the second leg 68 and the disc 90 thereby increasing the distance between the Hall effect sensor 100 and the magnet 72.

The tension in the spring 86 is selectively adjustable by the screw 76. The larger the tensile force that is generated by the spring 86, the larger the force that will be applied by the second leg 68 of the lever 62 on the disc 90 and diaphragm 32. The larger the force with which the lever 62 engages the disc 90 and diaphragm 32, the larger the pressure differential must be between the fluids in the low-pressure fluid chamber 38 and high-pressure fluid chamber 40 in order to initially move the diaphragm 32 and pivot the lever 62 and the magnet 72.

The Hall effect sensor 100 senses and responds to the magnetic force generated by the magnet 72. The Hall effect sensor 100 thereby detects the position of the magnet 72 on the other side of the partition wall 24 with respect to the location of the Hall effect sensor 100. When the distance between the Hall effect sensor 100 and the magnet 72 reaches a predetermined distance, the Hall effect sensor 100 will switch state. The relay circuit 110 that provides power to the Hall effect sensor 100 will notice the change in state of the Hall effect sensor 100 and thereupon will drive a relay that selectively opens or closes the contacts 112 to either turn an electrical load on or off.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A differential pressure switch comprising:

an enclosure including a peripheral wall and a one-piece non-perforate partition wall integrally attached to said peripheral wall around the entire perimeter of said partition wall, said enclosure including a sensor chamber located on a first side of said partition wall and a fluid cavity located on a second side of said partition wall, said partition wall sealing said sensor chamber in fluid-tight isolation from said fluid cavity;

a flexible diaphragm located within said fluid cavity, said diaphragm forming a low-pressure fluid chamber on a first side of said diaphragm and a high-pressure fluid chamber on a second side of said diaphragm, said diaphragm creating a fluid-tight seal between said low-pressure fluid chamber and said high-pressure fluid chamber, at least a portion of said diaphragm being movable in response to changes in the differential pressure between the pressure of a fluid in said low-pressure fluid chamber and the pressure of a fluid in said high-pressure fluid chamber;

a magnet located in said fluid cavity and coupled to said diaphragm in spaced relationship to said partition wall such that said magnet changes position with respect to said partition wall in response to movement of said diaphragm;

a sensor located in said sensor chamber such that said sensor and said magnet are located on opposite sides of said partition wall, said sensor adapted to sense the magnetic force generated by said magnet and thereby detect the distance between said magnet and said sensor;

whereby said sensor is adapted to indicate when said magnet is located a predetermined distance from said sensor such that a predetermined differential in pressure exists between the pressure of the fluid in the low-pressure fluid chamber and the pressure of the fluid in the high-pressure fluid chamber, and whereby said partition wall maintains said sensor in fluid-tight isolation from said low-pressure fluid chamber and said high-pressure fluid chamber.

2. The differential pressure switch of claim 1 wherein said sensor comprises a Hall effect sensor.

3. The differential pressure switch of claim 2 including a flexible arm located in said sensor chamber, said arm including a first end and a second end, said first end of said arm connected to said enclosure, said sensor being attached to said second end of said arm.

4. The differential pressure switch of claim 3 including an adjustment mechanism located in said sensor chamber, said adjustment mechanism adapted to selectively flex said arm to thereby reposition said sensor and thereby adjust the distance between said sensor and said magnet.

5. The differential pressure switch of claim 4 wherein said adjustment mechanism comprises a selectively rotatable threaded shaft.

6. The differential pressure switch of claim 1 including a plurality of electrical contacts located in said sensor chamber, said contacts adapted to be selectively opened and closed in response to said sensor.

7. The differential pressure switch of claim 6 including means located in said sensor chamber for selectively opening and closing said electrical contacts in response to said sensor.

8. The differential pressure switch of claim 1 including a lever located in said fluid cavity and pivotally connected to said enclosure for pivotal movement about a pivot axis, said lever including a first leg adapted to engage said diaphragm, said magnet being attached to said first leg such that said magnet is pivotally moveable about said pivot axis.

9. The differential pressure switch of claim 8 including a resilient biasing member located in said fluid cavity adapted to bias said first leg of said lever into engagement with said diaphragm.

10. The differential pressure switch of claim 9 wherein said lever includes a second leg, said resilient biasing member being coupled to said second leg, said first leg and said second leg being conjointly pivotal with respect to one another about said pivot axis.

11. The differential pressure switch of claim 8 including a rigid disc located within said fluid cavity in overlying engagement with said diaphragm, said disc being located between said first leg of said lever and said diaphragm such that said first leg engages said disc.

12. The differential pressure switch of claim 1 wherein said sensor and said magnet are generally located along a first axis that is generally perpendicular to said diaphragm.

13. The differential pressure switch of claim 12 wherein said diaphragm is generally parallel to and spaced apart from said partition wall such that movement of said diaphragm in response to a change in differential pressure is along a second axis that is generally parallel to said first axis and such that movement of said magnet in response to movement of said diaphragm is generally along said first axis.

14. The differential pressure switch of claim 12 wherein said diaphragm is orientated such that movement of said diaphragm in a first direction in response to a change in differential pressure moves said magnet closer to said partition wall and said sensor, and movement of said diaphragm in a second direction opposite to said first direction in response to a change in differential pressure moves said magnet farther from said partition wall and said sensor.

15. The differential pressure switch of claim 1 wherein said enclosure comprises a housing including said peripheral wall and said portion wall, a cover removably attached to a first end of said housing, said cover and said housing forming said sensor chamber, and a base removably attached to a second end of said housing, said base and said housing forming said fluid cavity.

* * * * *